US010123508B2

(12) United States Patent
Lee et al.

(10) Patent No.: US 10,123,508 B2
(45) Date of Patent: Nov. 13, 2018

(54) APPARATUS FOR MEASURING AMOUNT OF FEED USING WEIGHT SENSOR

(71) Applicant: TOVSS, Taean (KR)

(72) Inventors: Joontaik Lee, Seoul (KR); Dong Kun Chung, Seoul (KR); Chang Hwa Jeong, Seosan (KR); Shin Jeong Song, Goyang (KR)

(73) Assignee: TOVSS, Taean (KR)

( * ) Notice: Subject to any disclaimer, the term of this patent is extended or adjusted under 35 U.S.C. 154(b) by 288 days.

(21) Appl. No.: 15/216,508

(22) Filed: Jul. 21, 2016

(65) Prior Publication Data

US 2017/0042118 A1 Feb. 16, 2017

(30) Foreign Application Priority Data

Aug. 10, 2015 (KR) .................. 10-2015-0112342

(51) Int. Cl.
*A01K 5/02* (2006.01)
*A01K 1/02* (2006.01)

(52) U.S. Cl.
CPC .......... *A01K 5/0283* (2013.01); *A01K 1/0209* (2013.01)

(58) Field of Classification Search
CPC ...... A01K 5/0283; A01K 1/0209; A01K 5/02; A01K 5/0225
See application file for complete search history.

(56) References Cited

U.S. PATENT DOCUMENTS

2017/0013802 A1* 1/2017 Zimmerman ........ A01K 5/0107
2017/0223926 A1* 8/2017 Ausman ............... A01K 5/0283

FOREIGN PATENT DOCUMENTS

| JP | 09-051736 A | 2/1997 |
| JP | 2004-357548 A | 12/2004 |
| KR | 20-0207877 B1 | 12/2000 |
| KR | 20-0302539 B1 | 1/2003 |
| KR | 10-1348964 B1 | 1/2014 |
| KR | 10-2014-0024522 A | 3/2014 |

* cited by examiner

*Primary Examiner* — Monica L Williams
(74) *Attorney, Agent, or Firm* — Patent Office of Dr. Chung Park

(57) ABSTRACT

Provided is an apparatus of measuring the amount of feed. The apparatus includes a feed tank, a plurality of sliders, a case, a plurality of guides, and a weight sensor. The feed tank includes a discharge tube disposed at a lower part thereof and includes a body filled with feed. The plurality of sliders is radially and vertically disposed on an outer surface of the feed tank. The case has a discharge tube insertion hole at a lower part thereof to receive a discharge tube of the feed tank and receives the feed tank. The plurality of guides is radially and vertically disposed on an inner surface of the case. The weight sensor is disposed under the guide and makes contact with a lower end of the slider of the feed tank to measure the weight of the feed tank and feed.

6 Claims, 8 Drawing Sheets

[FIG. 1]
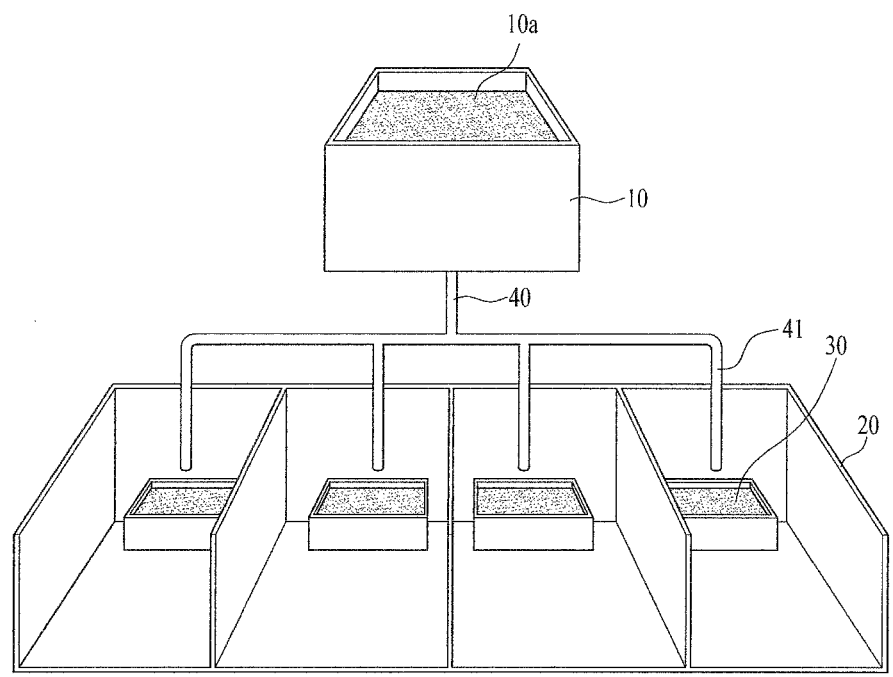

[FIG. 2]
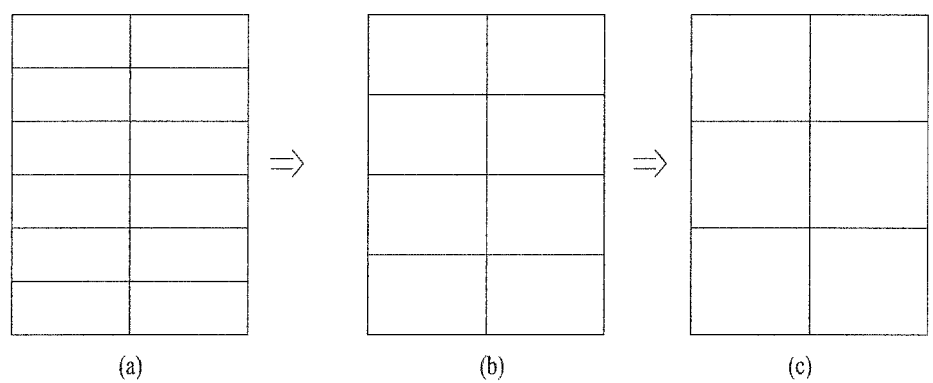
(a)　　　　　　(b)　　　　　　(c)

[FIG.3]
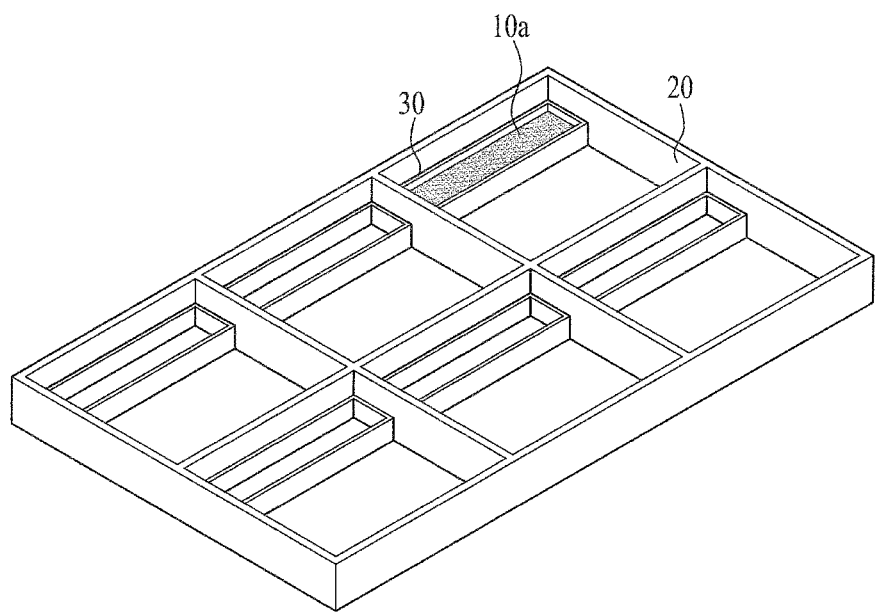

[FIG.4]
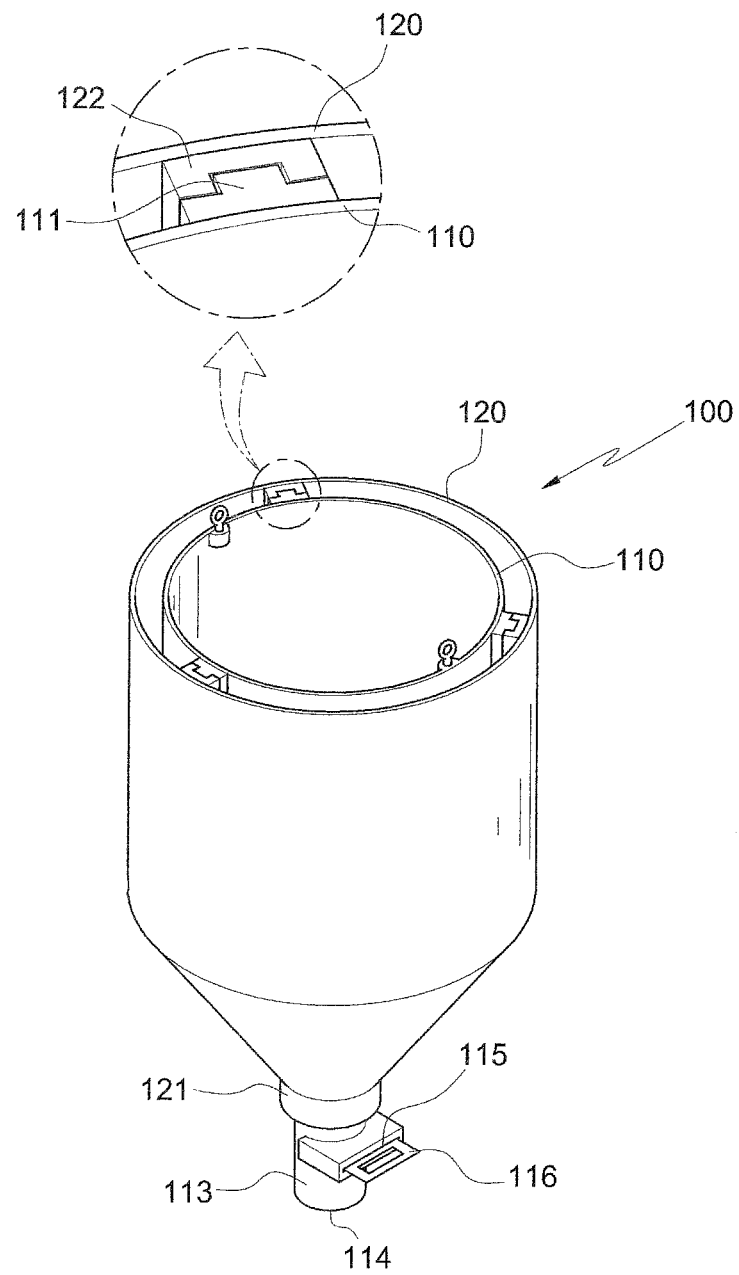

[FIG.5]
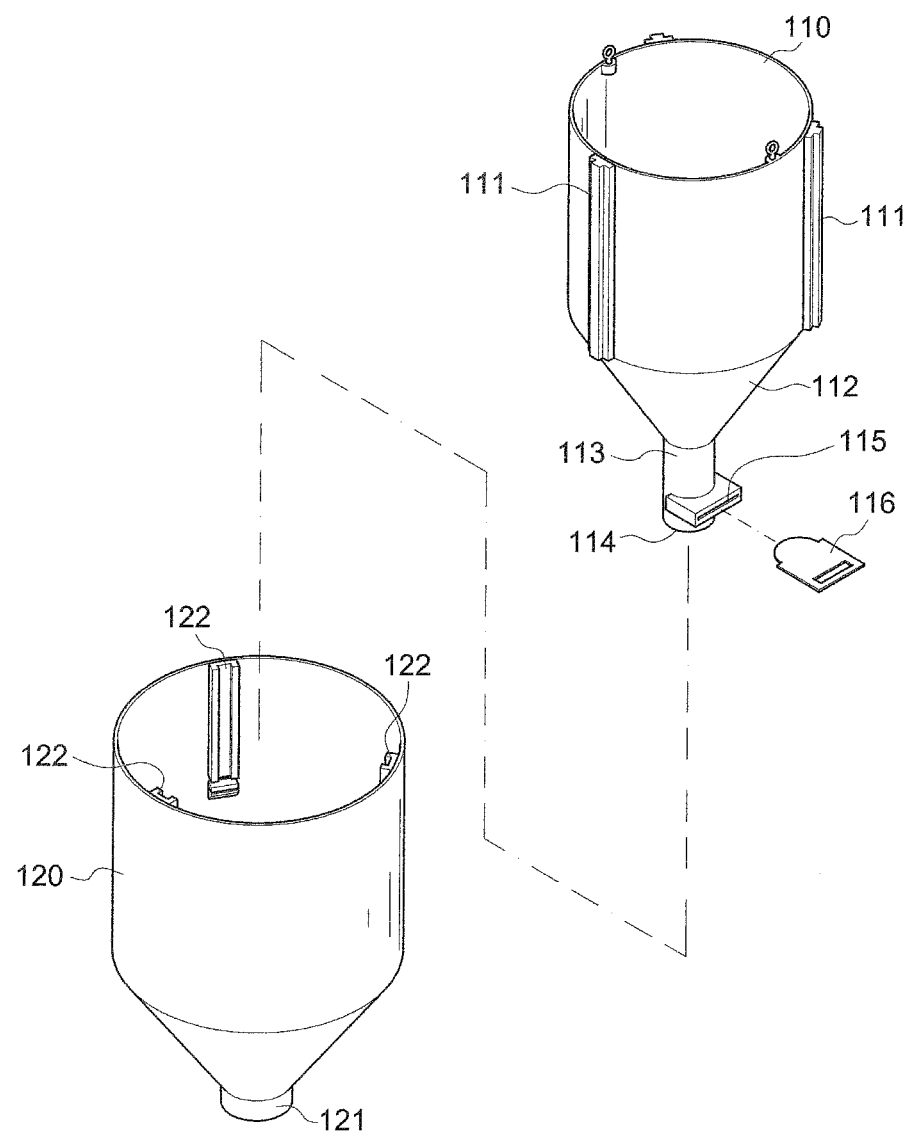

[FIG. 6]
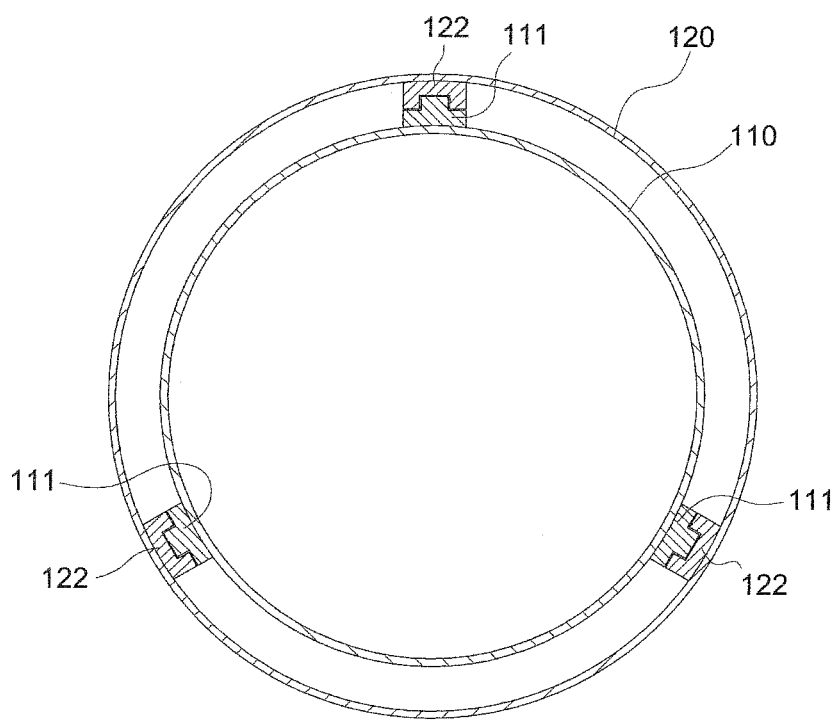

[FIG. 7]
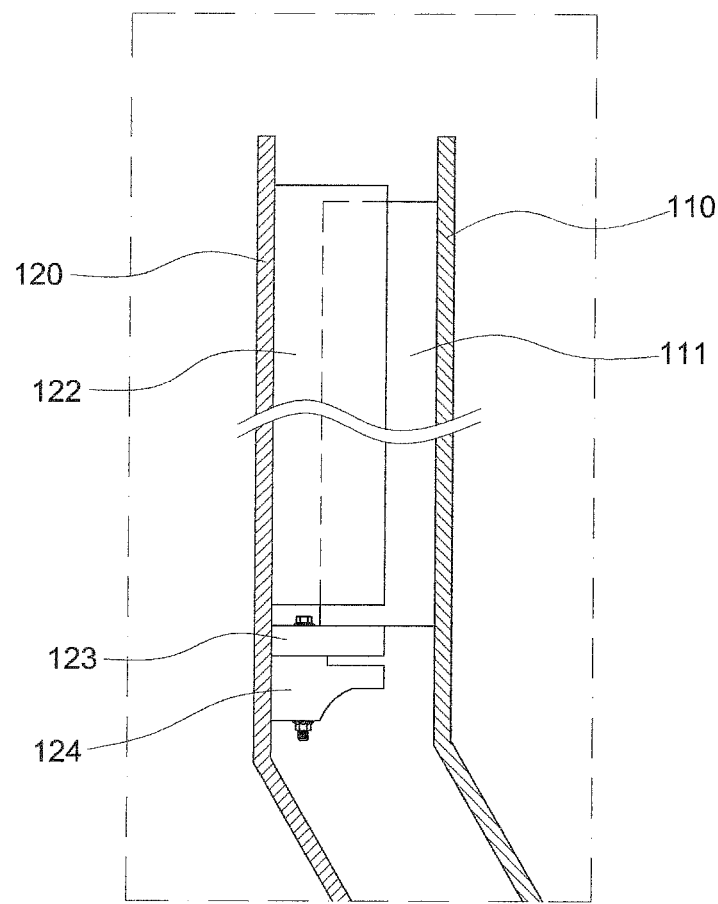

[FIG. 8]
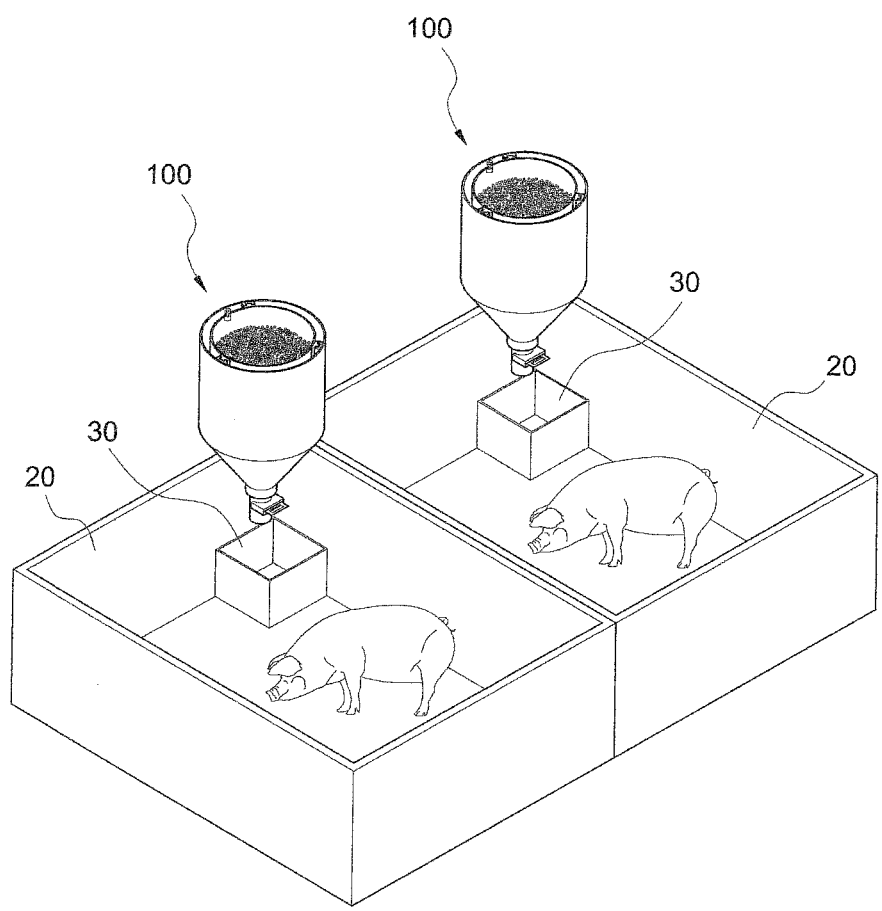

APPARATUS FOR MEASURING AMOUNT OF FEED USING WEIGHT SENSOR

CROSS-REFERENCE TO RELATED APPLICATIONS

This U.S. non-provisional patent application claims priority under 35 U.S.C. § 119 of Korean Patent Application No. 10-2015-0112342, filed on Aug. 10, 2015, the entire contents of which are hereby incorporated by reference.

BACKGROUND OF THE INVENTION

The present invention disclosed herein relates to an apparatus of measuring the amount of feed, and more particularly, to an apparatus of measuring the amount of feed using a weight sensor which can automatically measure the amount of feed intake of livestock in real-time and thus enable the growth management of livestock and efficient feed management in accordance with the amount of feed intake.

Generally, a livestock pen has two functions of streamlining livestock management and protecting livestock from natural weather.

Accordingly, the livestock pen needs good location, direction, ventilation, natural lighting and heat insulation, and also needs appropriate equipment for feeding period, cleaning, and sanitary control.

The type of livestock pen is roughly classified into an individual feeding type and a group feeding type depending on the kind and number of livestock accommodated in the livestock pen.

The former is used to accommodate livestock for breeding and birthing, and the latter is used to accommodate growing livestock or productive livestock (pig, dairy cattle, etc.).

Due to the recent distribution of group raising type, livestock pens for labor-saving which reduces labor needed for maintenance are increasing. Also, livestock feeding devices are being proposed to periodically feed livestock regardless of the amount of feed.

FIG. 1 is a view illustrating a typical livestock feeding device. The typical livestock feeding device includes a feed tank (10) storing a feed (10a), a livestock pen (20) divided into a plurality of spaces and having a certain size to accommodate livestock, a feed bucket (30) placed in each livestock pen (20), and a pipe (40) including a plurality of branch pipes (41) to supply the feed (10a) stored in the feed tank (10) into the feed bucket (30).

This livestock feeding device is formed into an automated facility such that a user can supply the feed (10a) into the feed bucket (30) by manually or automatically opening a valve of the feed tank (10) at a certain period and thus livestock can take in the feed (10a).

Meanwhile, livestock in the livestock pen are not raised in one livestock pen, and are moved to different livestock pens in accordance with the size thereof.

For example, 1 to 6 month old livestock are raised in a livestock pen having a certain space according to a predetermined number of livestock as shown in FIG. 2A, and 6 to 12 month old livestock are raised in a livestock pen having a space relatively larger than the space of the livestock pen (a) as shown in FIG. 2B. Also, 12 or more month old livestock are raised a livestock pen having a space relatively larger than the livestock pen (b) as shown in FIG. 2C.

Although different depending on the size of the livestock pen or the number of livestock, a pigpen generally includes 16 pens, and a larger pigpen also includes 32 pens.

In this process of raising livestock, the growth and development of livestock can be maintained at an optimal state by appropriately controlling the amount of water and feed and the temperature of livestock pen.

However, since a typical livestock feeding device uniformly supplies a feed in accordance with an arbitrary prediction of a user, a feed is supplied regardless of the condition of livestock.

In other words, when the same amount of feed (10a) is supplied into the feed bucket (30) placed in the livestock pen (20), livestock take in the feed (10a) but the feed (10a) supplied into the feed bucket (30) may remain. In this case, a user cannot know why livestock leave the feed (10a) such as whether or not there is a health disorder in livestock or whether or not the feed (10a) is excessively supplied.

Also, when the feed (10a) remains in the feed bucket (30), a user should clean the remaining feed. In addition, when the feed (10a) is spoiled, hygienic state and cleanness in the livestock pen may become bad.

Also, when the feed is not appropriately supplied in accordance with the age of livestock and is excessively supplied, the cost for maintenance according to the feed purchase may increase.

Prior Art Document

Patent Document. 1: Korean Patent Application Serial No. 10-2013-0007240, filed on Jan. 23, 2013, entitled "apparatus and system for feeding fodder automatically," and issued as a Korean Patent 10-1348964 on Jan. 2, 2014.

SUMMARY OF THE INVENTION

The present invention provides an apparatus of measuring the amount of feed, which is easy to maintain, and enables the growth and development management of livestock and efficient feed management according to the amount of the feed intake of livestock by measuring in real-time the weight of feed filled in a feed tank.

Embodiments of the present invention provide apparatuses of measuring the amount of feed, including: a feed tank including a discharge tube disposed at a lower part thereof and including a body filled with feed; a plurality of sliders radially and vertically disposed on an outer surface of the feed tank; a case having a discharge tube insertion hole at a lower part thereof to receive a discharge tube of the feed tank and receiving the feed tank; a plurality of guides radially and vertically disposed on an inner surface of the case; and a weight sensor disposed under the guide and making contact with a lower end of the slider of the feed tank to measure a weight of the feed tank and feed.

In some embodiments, the body of the feed tank may include an inclination surface downwardly narrowing at a lower part thereof, and may include a discharge tube at a lower end of the inclination surface.

In other embodiments, the discharge tube may have a blocking plate insertion slit formed at one side thereof, and the blocking plate insertion slit may receive a blocking plate to close the discharge tube.

In still other embodiments, the slider may have a cross-section of a 'T' shape, and the guide may have a cross-section of a 'U' shape such that a protrusion of the slider is inserted and guided in a groove of the guide.

In even other embodiments, the apparatus may include a sensor supporting member disposed at a lower part of the case to support a lower part of the weight sensor.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a view illustrating a typical apparatus of measuring the amount of feed;

FIG. 2 is a view illustrating the size of livestock pen according to the age of livestock;

FIG. 3 is a view illustrating a typical livestock pen;

FIG. 4 is a perspective view illustrating a typical apparatus of measuring the amount of feed according to an embodiment of the present invention;

FIG. 5 is an exploded perspective view illustrating the configuration of an apparatus of measuring the amount of feed according to an embodiment of the present invention;

FIG. 6 is a cross-sectional view illustrating an apparatus of measuring the amount of feed according to an embodiment of the present invention;

FIG. 7 is a partial side cross-sectional view illustrating a combination structure of a case and a feed tank according to an embodiment of the present invention; and FIG. 8 is a view illustrating a use state of an apparatus of measuring the amount of feed according to an embodiment of the present invention.

Reference numerals set forth in the drawings includes reference to the following elements as further discussed below:

100: apparatus of measuring the amount of feed
110: feed tank
111: slider
112: inclination surface
113: discharge tube
114: outlet
115: blocking plate insertion slit
116: blocking plate
120: case
121: discharge tube insertion hole
122: guide
123: weight sensor
124: sensor supporting member

DETAILED DESCRIPTION OF PREFERRED EMBODIMENTS

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

Hereinafter, an exemplary embodiment of apparatus of measuring the amount of feed according to an embodiment of the present invention will be described with reference to the accompanying drawings.

As shown in FIG. 4, the apparatus of measuring the amount of feed may include a case 120 having cylindrical shape and a feed tank 110 having a cylindrical shape and inserted into the case 120.

The feed tank 110 may be filled with a feed to supply the feed into a feed bucket 30 of a livestock pen 20. The case 120 may house the feed tank 110 and may support the feed tank 110.

As shown in FIG. 5, the feed tank 110 may include a body having a cylindrical shape and having an upper part and a lower part opened. The lower part of the body of the feed tank 110 may be formed such that the inner diameter thereof gradually narrows in a downward direction. Also, a discharge tube 113 having a pipe shape may be formed at the lower end of the body of the feed tank 110.

Also, a blocking plate insertion slit 115 may be formed at the discharge tube 113 formed at the lower part of the feed tank 110 to receive a blocking plate 116 in a lateral direction. When the blocking plate 116 is inserted into the blocking plate insertion slit 115, the blocking plate 116 may close an outlet 114 such that the feed filled in the feed tank 110 is not discharged through the outlet 114.

That is, when a livestock pen manager pulls out the blocking plate 116 from the blocking plate insertion slit 115 of the feed tank 110, the feed filled in the feed tank 110 may be discharged through the outlet 114. When the blocking plate 116 is inserted into the blocking plate insertion slit 115 of the feed tank 110, the blocking plate 116 may close the outlet 114, blocking the feed from being discharged out of the outlet 114.

The body of the feed tank 110 may have an inclination surface 112 such that the inner diameter of the lower part of the body gradually narrows in a down direction. Thus, when the feed is discharged out of the outlet 114, the feed in the feed tank 110 may be smoothly discharged out of the outlet 114 by the inclination surface 112, and all the feed may be discharged without remaining in the feed tank 110.

The feed tank 110 may be inserted into the case 120, and the feed tank 110 may include a slider 111 radially formed on the outer surface of the feed tank 110 and formed in a vertical direction. Thus, the slider 111 may guide the feed tank 110 such that the feed tank 110 is inserted into the center of the case 120 having a lager diameter than the feed tank 110.

As shown in FIG. 5, the case 120 receiving the feed tank 110 may include a body having a cylindrical shape and including an upper part and a lower part opened. Also, the case 120 may include a guide 122 formed on the inner wall of the body in a vertical direction, and the lower part of the case 120 may be formed such that the inner diameter thereof gradually narrows in a downward direction. In addition, the case 120 may have a discharge tube insertion hole 121 to receive the discharge tube 113 of the feed tank 110.

As shown in FIG. 6, when the feed tank 110 is inserted into the case 120, the slider 111 radially formed on the outer surface of the feed tank 110 may make contact with the guide 122 formed in the inner surface of the case 120, and may serve to guide the feed tank 110 such that the feed tank 110 can be accurately inserted into the center of the case 120.

In this embodiment, the slider 122 may have a cross section of a 'T' shape, and the guide 111 may have a cross section of a 'U' shape such that a protrusion (not numbered) of the slider 122 is inserted into a groove (not numbered) of the guide 110 and thus the guide 111 guides the slider 122. However, the guide 111 may also be configured to guide the slider 122 in another form.

Also, a unit for measuring the weight of feed filled in the feed tank 110 may be disposed on the case 120. The unit may include a weight sensor 123 and a sensor supporting member 124. As shown in FIG. 7, the weight sensor 123 may be disposed under the guide 122 of the case 120, and the weight sensor 123 may be supported by the sensor supporting member 124.

When the feed tank 110 is filled with feed, the weight of the feed tank 110 may be heavy, and the coupling part of the weight sensor 123 and the case 120 may be broken. Accordingly, as shown in FIG. 7, the weight sensor 123 may be configured to be stably supported by the sensor supporting member 124.

When the feed tank 110 is inserted into the case 120, the lower end of the slider 111 of the feed tank 110 may make contact with the top surface of the weight sensor 123 while the slider 111 of the feed tank 110 is guided by the guide 122 of the case 120.

When the slider 111 of the feed tank 110 makes contact with the weight sensor 123, the weight of the feed tank 110 and the feed filled in the feed tank 110 may be delivered to the weight sensor 123, and the weight sensor 123 may measure the weight. Thus, the amount of feed inside the feed tank 110 can be measured.

As shown in FIG. 8, the apparatus 100 of measuring the amount of feed configured as above may be disposed over the feed bucket 30 of the livestock pen 20, thereby conveniently supplying feed filled in the feed tank 110 into the feed bucket 30.

Also, in the apparatus 100 of measuring the amount of feed according to the embodiment, including the feed tank 120 and the case 110, when a failure occurs on any part of the apparatus 100, the feed tank 110 can be simply separated from the case 120, and can be repaired. In addition, since any one of the feed tank 110 and the case 120 can be replaced, the maintenance is easy. Furthermore, since the disassembling and assembling are simple, the replacement can be quickly performed.

Also, since the remaining amount of feed in the feed tank 110 is monitored in real-time by measuring the weight of the feed tank 110, the growth of livestock according to the amount of feed intake can be efficiently managed. In addition, efficient feed management can be achieved by controlling the amount of feed to be supplied next time through the monitoring of the amount of feed remaining in the feed tank 110.

In this embodiment, although the feed tank 110 and the case 120 are configured to have a cylindrical shape, the feed tank 110 and the case 120 may be formed into various shapes such as triangular or rectangular shape.

For example, if the slider 111 formed on the outer surface of the feed tank 110 can be vertically guided by the guide 122 formed on the inner surface of the case 120, the feed tank 110 and the case 120 may be formed into any shapes.

The technical spirits of the present invention have been described through some embodiments above.

It will be clear that those skilled in the art can variously change or modify the above-mentioned embodiments from the described details of the present invention.

Also, although not described or shown in the drawings, it will be clear to those skilled in the art that the present invention can be modified into various forms including the technical spirit of the present invention from the described details of the present invention, which still belong to the scope of the present invention.

The above embodiments described with reference to the accompanying drawings have been described in order to explain the present invention, and the scope of the present invention will not be limited to these embodiments.

What is claimed is:

1. An apparatus of measuring the amount of feed, comprising:
    a feed tank comprising a discharge tube disposed at a lower part thereof and comprising a body for containing feed;
    a plurality of sliders radially and vertically disposed on an outer surface of the feed tank;
    a case having a discharge tube insertion hole at a lower part thereof to receive a discharge tube of the feed tank and receiving the feed tank;
    a plurality of guides radially and vertically disposed on an inner surface of the case; and
    a weight sensor disposed under one of the plurality of guides and making contact with a lower end of one of the plurality of sliders of the feed tank to measure a weight of the feed tank and feed.

2. The apparatus of claim 1, wherein the body of the feed tank comprises an inclination surface downwardly narrowing at a lower part thereof, and comprises the discharge tube at a lower end of the inclination surface.

3. The apparatus of claim 2, wherein the discharge tube has a blocking plate insertion slit formed at one side thereof, and
    the blocking plate insertion slit receives a blocking plate to close the discharge tube.

4. The apparatus of claim 1, wherein the discharge tube has a blocking plate insertion slit formed at one side thereof, and
    the blocking plate insertion slit receives a blocking plate to close the discharge tube.

5. The apparatus of claim 1, wherein each of the plurality of sliders has a cross-section of a 'T' shape, and each of the plurality of guides has a cross-section of a 'U' shape such that a protrusion of each of the plurality of sliders is inserted and guided in a groove of each of the plurality of guides.

6. The apparatus of claim 1, comprising a sensor supporting member disposed at a lower part of the case to support a lower part of the weight sensor.

* * * * *